Figure 1:
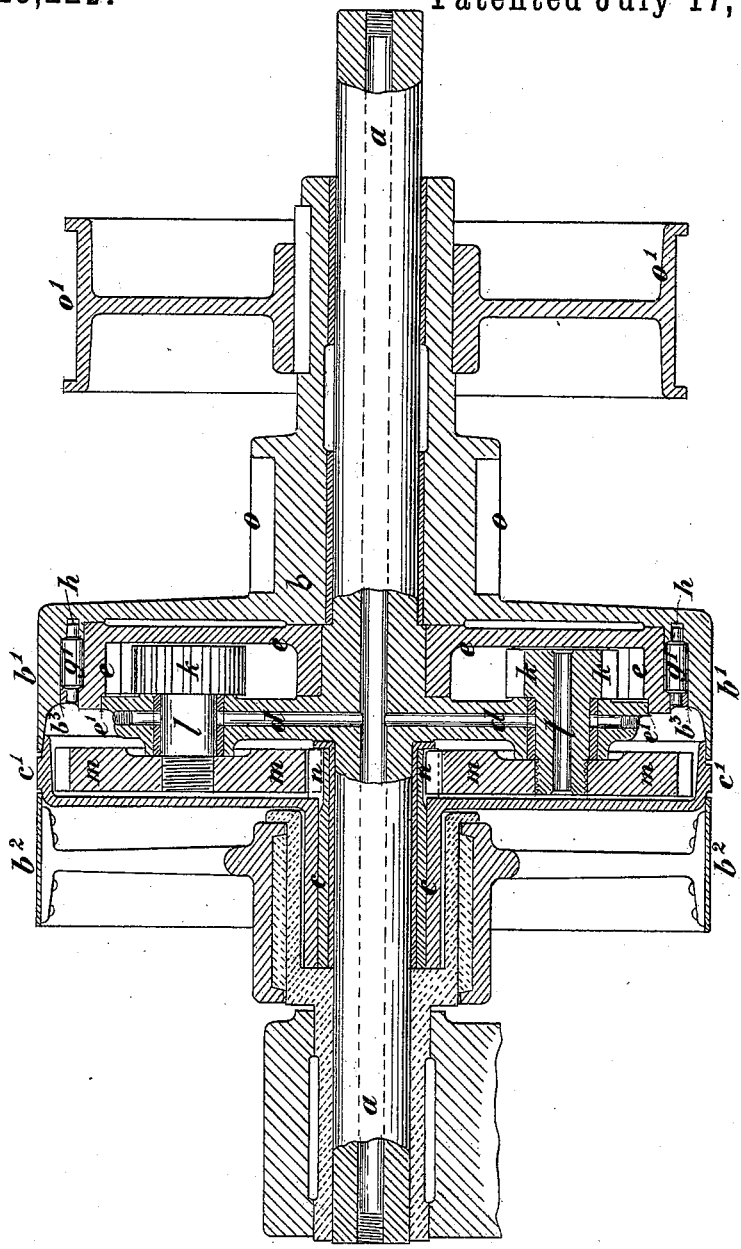

(No Model.) 4 Sheets—Sheet 1.

J. J. MANN, J. H. SMITH & H. G. READ.
SPEED GEARING.

No. 523,221. Patented July 17, 1894.

Witnesses.
George Baumann
James Gracie

Inventors.
John J. Mann
James H. Smith
Henry G. Read
By their Attorneys
Howson and Howson (No Model.) 4 Sheets—Sheet 2.
J. J. MANN, J. H. SMITH & H. G. READ.
SPEED GEARING.
No. 523,221. Patented July 17, 1894.
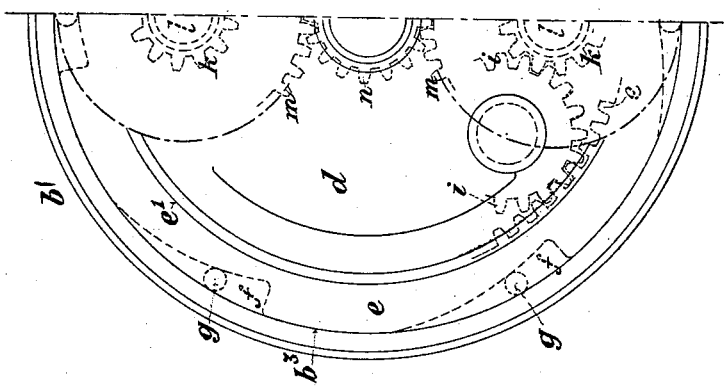
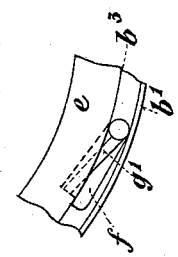
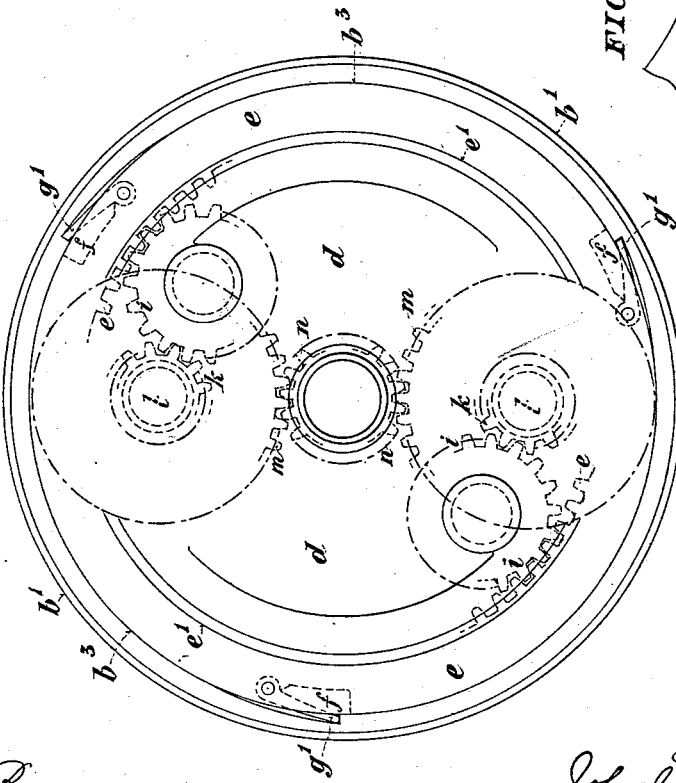

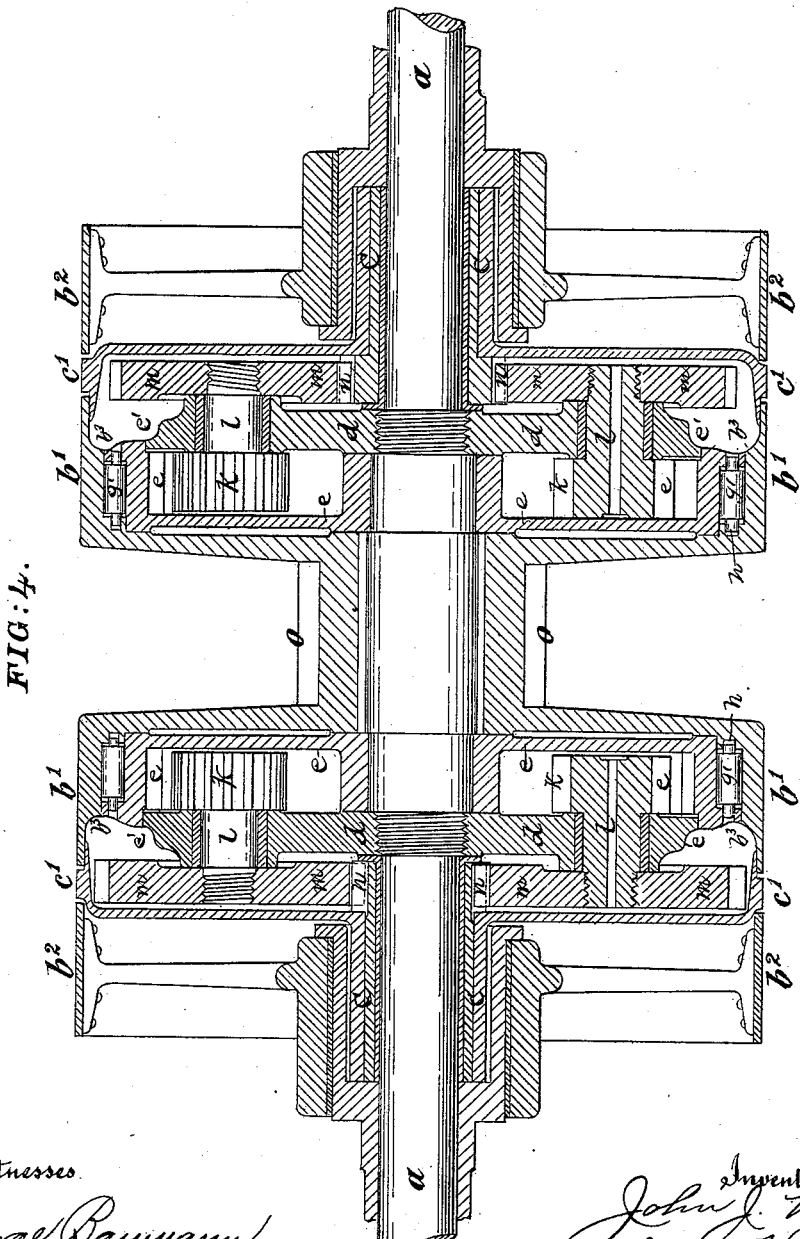

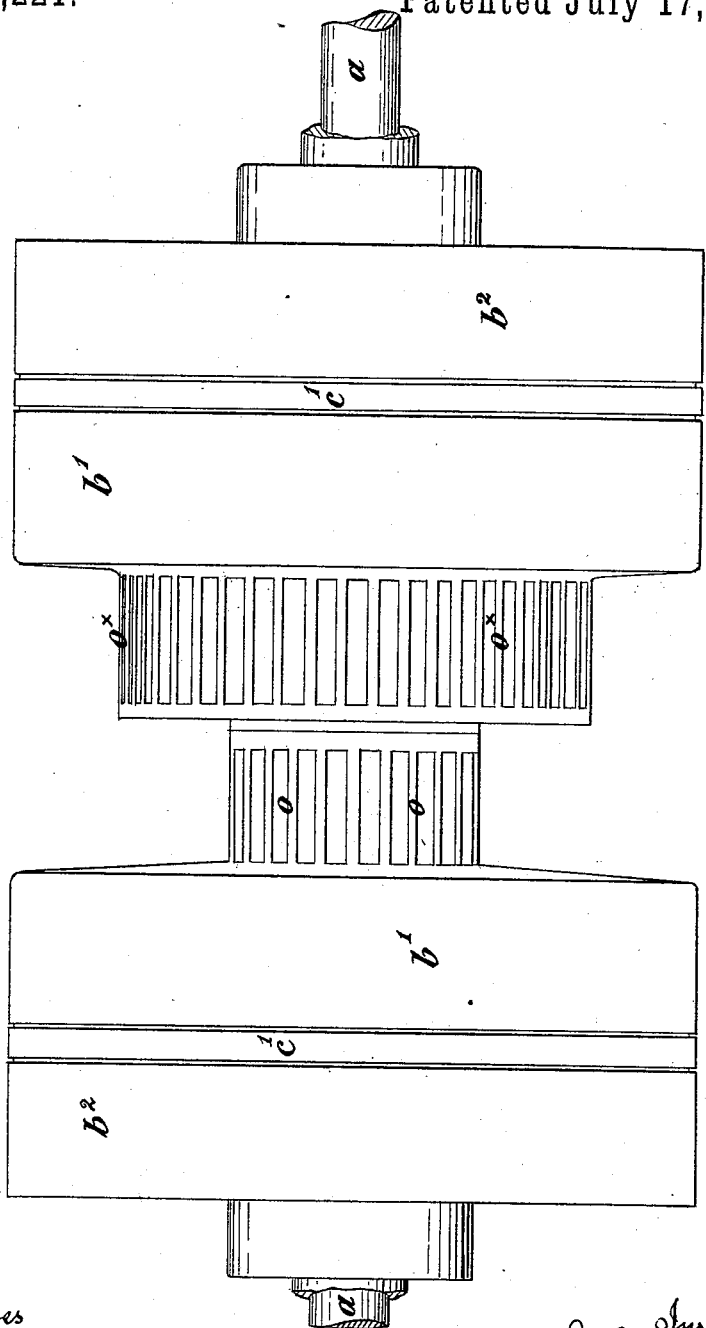

United States Patent Office.

JOHN J. MANN, JAMES H. SMITH, AND HENRY GEO. READ, OF SALFORD, ENGLAND, ASSIGNORS TO THE FUSTIAN CUTTING MACHINE COMPANY, LIMITED, OF SAME PLACE.

SPEED-GEARING.

SPECIFICATION forming part of Letters Patent No. 523,221, dated July 17, 1894.

Application filed April 12, 1892. Serial No. 428,816. (No model.)

*To all whom it may concern:*

Be it known that we, JOHN JAMES MANN, JAMES HOYLE SMITH, and HENRY GEORGE READ, subjects of the Queen of Great Britain and Ireland, and all residing at Salford, in the county of Lancaster, England, have invented an Improved Differential Speed-Gearing, of which the following is a specification.

Our invention relates to mechanism employed for obtaining different rates of speed for the driving of machines, or parts of machinery where it is desired to employ at alternate intervals, or at will either a slow or quick speed, and our improved gearing is so arranged that either speed is instantaneously available with no stopping of the machinery to which it may be applied, and no shock to any of its parts, either speed being also entirely independent of the other.

The nature of our said invention and the manner in which the same is to be performed or carried into practical effect will be readily understood on reference to the four sheets of drawings hereunto annexed and the following explanation thereof.

Figure 1 on the drawings is a longitudinal section and Fig. 2 an internal face view of our invention arranged as a set of fast and loose pulleys mounted on a fixed stud or bar, and Fig. 3 is a half face view of a slight modification thereof. Figs. 3$^a$, 4 and 5 show modifications hereinafter more particularly referred to.

The driving belt runs on the loose pulley when the machinery to which the gearing is applied is to remain at rest. To the wheel which drives the said machinery (and which may be a toothed wheel, or pulley or other equivalent) is attached or cast one of the "fast" pulleys, which may be either actuated directly, or by the driving strap before named, or by internal gearing actuated by an adjacent pulley, which thus acts as a second fast pulley when the driving strap is moved onto it, this second "fast" pulley being preferably intermediate the "loose" pulley and that to which the driving wheel is attached.

We would here remark that the term "fast" pulley is (in this specification) used to denote pulleys actuating the machine, as distinguished from the "loose" pulley upon which the belt runs when the machine is at rest.

The internal gearing above mentioned may be modified in a variety of ways but we prefer to adopt the arrangement shown on the drawings, which we have invented for the purpose.

$a$ is a fixed stud or bar upon which run loosely two tubular bosses $b$ and $c$. To the boss $b$ is cast or otherwise fixed the first fast pulley $b'$ and to the tube $c$ is fixed the boss of the second fast pulley $c'$.

$b^2$ is the loose pulley.

Upon the fixed stud or bar $a$ on which the fast pulleys $b'$ and $c'$ run, is keyed or otherwise secured, or cast, a plate or yoke $d$ of suitable form (preferably a disk inclosed between the two fast pulleys $b'$ and $c'$). On that side of the said plate $d$ on which the fast pulley $b'$ is placed is an annular or internally toothed wheel $e$ free to revolve upon the fixed stud $a$ or a boss thereon. The periphery of this wheel $e$ is formed with wedge shaped recesses $f$ (see Fig. 3) in each of which is placed a small roller $g$ which wedges between the internally toothed wheel $e$ and the interior of the first named fast pulley $b'$; or instead of these rollers $g$ we modify the form of the recesses $f$ (as shown at Figs. 1 and 2) and employ catches $g'$ which have pins or studs cast therewith; one of these pins fits in a hole made in the rim of the wheel $e$ and the other runs in an annular groove $h$ turned in the inside of the pulley $b'$ and consequently the latter will be driven by the internal wheel $e$ in one direction only.

Gearing into the internally toothed wheel $e$ we mount upon the plate or yoke $d$ a carrier wheel or wheels $i$ (see Fig. 2) driven from a pinion or pinions $k$ on a short shaft or shafts $l$ carried by the fixed plate or yoke $d$, on the other side of which is another pinion $m$ on the same short shaft $l$ gearing with a toothed wheel $n$ attached to the boss of the second fast pulley $c'$. The carrier wheels $i$ will give to the internal wheel $e$ the same direction of motion as that of the second fast pulley $c'$, when the driving strap is moved onto the latter, and the intermediate gearing may be so proportioned as to give any required reduction of speed to the said internally toothed wheel $e$ and through it and its wedging rollers $g$ or catches $g'$ to the first fast pulley $b'$, and through the driving wheel $o$ (or pulley $o'$) attached to the latter, to the machinery to which the differential gear is applied. When however the strap is moved upon the first fast pulley $b'$ the wedging rollers $g$ or catches $g'$ will fall back into the deeper part of the recesses $f$ in the periphery of the internally toothed wheel $e$, which will then remain stationary, and the driving wheel or pulley $b'$ is actuated directly by the driving strap.

The inside rim of the first fast pulley $b'$ is preferably turned at $b^3$ to fit part of the periphery of the internally toothed wheel $e$, which is also flanged and turned at $e'$ to fit upon the fixed plate or yoke $d$.

The contiguous edges of the two fast pulleys $b'$ and $c'$ are fitted together with internal and external facings, and thus the weight of the two pulleys $b'$ and $c'$ and the internally toothed wheel $e$ is carried by the fixed plate or yoke $d$ as well as by their several bosses on the fixed stud or bar $a$, and any lubricant supplied to the interior of the mechanism will be retained and will not rapidly leak away.

If preferred the wedge shaped recesses $f$ may be made in the rim of the pulley $b'$ instead of in the periphery of the internally toothed wheel $e$, as shown at Fig. $3^a$. Also two differentially driving pulleys may be combined with one driving wheel $o$ as shown at Fig. 4, thus obtaining three different speeds instead of two, or two differentially driving pulleys may be combined with two driving wheels $o$ and $o^+$ thereby obtaining further variation in the speeds as seen at Fig. 5. The pulleys may also be placed differently with regard to each other if preferred.

It will be seen from the foregoing description that the driving belt can be instantaneously shifted (by any known means) from the loose pulley to either of the fast pulleys without shock or noise and the belt may remain partly on one of the latter, and partly on the other with no detriment to itself or to the mechanism composing our differential speed gearing, as in such case the machinery would be driven by the fast pulley over which the driving belt had most control.

We claim—

Three belt pulleys side by side for the shifting of a belt from one to the other, one a loose pulley, and one a "fast" pulley for imparting motion directly to the driving wheel or pulley, and gearing connecting the third belt pulley to the said "fast" pulley, whereby different speeds may be obtained by shifting the belt, substantially as described.

In testimony whereof we have signed our names to this specification in the presence of two subscribing witnesses.

JOHN J. MANN.
JAMES H. SMITH.
HENRY GEO. READ.

Witnesses:
GEORGE DAVIES,
JNO. HUGHES.